US010009810B2

(12) United States Patent
Uchino et al.

(10) Patent No.: US 10,009,810 B2
(45) Date of Patent: Jun. 26, 2018

(54) HANDOVER METHOD AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Satoshi Nagata, Tokyo (JP); Wuri Andarmawanti Hapsari, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 95 days.

(21) Appl. No.: 14/889,037

(22) PCT Filed: Apr. 30, 2014

(86) PCT No.: PCT/JP2014/061941
§ 371 (c)(1),
(2) Date: Nov. 4, 2015

(87) PCT Pub. No.: WO2014/181735
PCT Pub. Date: Nov. 13, 2014

(65) Prior Publication Data
US 2016/0088538 A1 Mar. 24, 2016

(30) Foreign Application Priority Data
May 9, 2013 (JP) ................................. 2013-099417

(51) Int. Cl.
| | |
|---|---|
| *H04L 1/00* | (2006.01) |
| *H04W 36/04* | (2009.01) |
| *H04W 36/00* | (2009.01) |
| *H04W 72/04* | (2009.01) |
| *H04W 74/00* | (2009.01) |
| *H04W 76/27* | (2018.01) |

(52) U.S. Cl.
CPC ........... *H04W 36/04* (2013.01); *H04W 36/00* (2013.01); *H04W 72/0406* (2013.01); *H04W 74/006* (2013.01); *H04W 76/27* (2018.02)

(58) Field of Classification Search
CPC .. H04B 7/2121; H04B 7/2123; H04B 7/2615; H04B 7/18541; H04J 2203/0069;
(Continued)

(56) References Cited

U.S. PATENT DOCUMENTS

| | | | |
|---|---|---|---|
| 2007/0004416 A1 | 1/2007 | Nishimura et al. | |
| 2009/0238144 A1* | 9/2009 | Cave ..................... | H04W 36/18 370/331 |

(Continued)

FOREIGN PATENT DOCUMENTS

| | | |
|---|---|---|
| EP | 2249602 A1 | 11/2010 |
| WO | 2008/131589 A1 | 11/2008 |
| WO | 2009/022860 A1 | 2/2009 |

OTHER PUBLICATIONS

European Search Report issued in corresponding European Application No. 14795212.1, dated Nov. 21, 2016 (12 pages).
(Continued)

*Primary Examiner* — Dady Chery
(74) *Attorney, Agent, or Firm* — Jonathan P. Osha (57) ABSTRACT

In implementation of "RRC diversity" in a handover procedure between cells under different radio base stations (eNB), "HO command" is transmitted in a handover destination cell at an appropriate timing. A handover method of the invention includes: a step A of causing a radio base station (eNB #1) to transmit "HO command" to a mobile station (UE); a step B of causing a radio base station (eNB #10) to start transmission of the "HO command" to the mobile station (UE) based on a scheduling start instruction from the radio base station (eNB); and a step C of causing the radio base station (eNB #1) to repeat transmission of the "HO command" to the mobile station (UE) at a predetermined cycle for a period until the detection of a scheduling stop trigger.

10 Claims, 5 Drawing Sheets

(58) Field of Classification Search
CPC ....... H04J 4/00; H04Q 2213/394; H04L 5/26; H04L 47/767; H04W 72/04; H04W 72/12; H04W 76/00; H04W 36/00; H04W 36/0005; H04W 36/0016
USPC .......................... 370/329–335; 455/436–450, 455/435.1–435.3, 432.1–434
See application file for complete search history.

(56) References Cited

U.S. PATENT DOCUMENTS

| | | | |
|---|---|---|---|
| 2010/0173660 A1* | 7/2010 | Liu | ....................... H04W 48/16 455/501 |
| 2010/0330994 A1* | 12/2010 | Matsuo | ................ H04J 11/0069 455/436 |

OTHER PUBLICATIONS

International Search Report in corresponding application No. PCT/JP2014/061941 dated Jun. 10, 2014 (1 page).
Written Opinion in corresponding application No. PCT/JP2014/061941 dated Jun. 10, 2014 (3 pages).
Broadcom Corporation; "Architectures for dual connectivity"; 3GPP TSG RAN WG2 Meeting #81bis, R2-130989, Chicago, USA, Apr. 15-19, 2013 (12 pages).
Ericsson et al.; "Enhancing mobility robustness and offloading potential with RRC diversity"; 3GPP TSG-RAN WG2 #81bis, R2-131211, Chicago, USA, Apr. 15-19, 2013 (8 pages).
Office Action issued in corresponding European Application No. 14795212.1, dated Oct. 16, 2017 (6 pages).

* cited by examiner

HANDOVER METHOD AND RADIO BASE STATION

TECHNICAL FIELD

The present invention relates to a handover method and a radio base station.

BACKGROUND ART

In LTE (Long Term Evolution), when a mobile station UE in "RRC Connected state" moves across a cell boundary, a handover procedure is to take place in order to cause the mobile station UE to perform communication always by using an appropriate cell.

Figure 4:
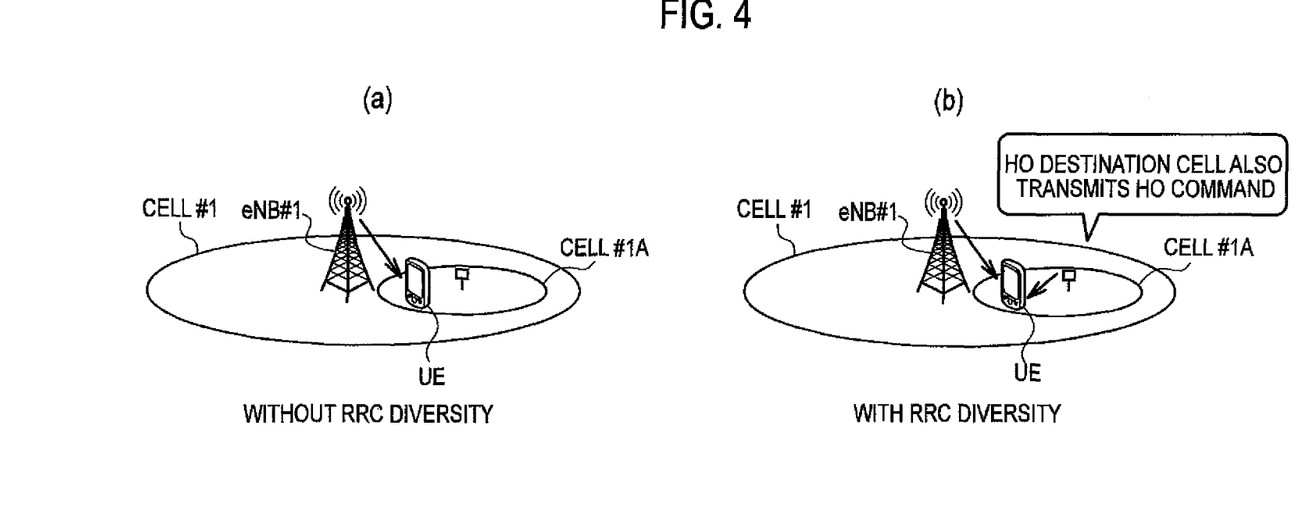
FIG. 4(a) is a view for explaining the related art.
FIG. 4(b) is a view for explaining the related art.

However, when the handover procedure takes place between cells using the same frequency, there is a concern that the mobile station UE cannot receive "HO command" from a handover source cell due to interference from a neighboring cell, and the handover procedure ends up in failure (see FIG. 4(a)).

Accordingly, as shown in FIG. 4(b), there has been proposed a control method (RRC diversity) for transmitting the "HO command" not only from the handover source cell but also from a handover destination cell in order to improve a probability of reception of the "HO command" by the mobile station UE, thus to suppress a failure in the handover procedure (see Non-patent Document 1).

Here, the "RRC diversity" can be implemented by CoMP transmission-reception (Coordinated Multi-Point transmission-reception) on a downlink.

Note that the CoMP transmission-reception on the downlink is a technique for improving throughput on the downlink by transmitting either the same or different data from multiple TPs (Transmission Points) to the mobile station UE.

PRIOR ART DOCUMENT

Non-Patent Document

Non-patent document 1: 3GPP Written Contributions R2-131211

SUMMARY OF THE INVENTION

At present, the CoMP transmission-reception on the downlink can be carried out only in the cells under the same radio base station eNB.

Figure 5:
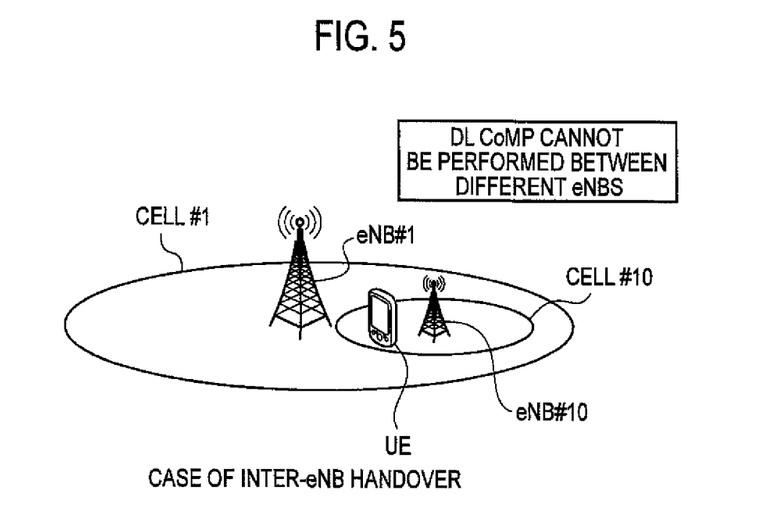
FIG. 5 is a view for explaining the related art.

Accordingly, there is a problem that the "RRC diversity" cannot be implemented in a handover procedure between cells under different radio base stations eNB as shown in FIG. 5.

Specifically, in implementation of the "RRC diversity" in the handover procedure between the cells under the different radio base stations eNB according to the conventional LTE method, there is a problem that at which timing a handover destination radio base station eNB should start transmission of "HO command" is not specified.

The present invention has been made in view of the aforementioned problem. An object of the present invention is to provide a handover method and a radio base station which are capable of transmitting "HO command" in a handover destination cell at an appropriate timing in implementation of "RRC diversity" in a handover procedure between cells under different radio base stations eNB.

A first feature of the present invention is summarized as a handover method of performing a handover of a mobile station connected to a first cell under a first radio base station, to a second cell under a second radio base station, including: a step A of causing the first radio base station to transmit a handover instruction signal to the mobile station; a step B of causing the second radio base station to start transmission of the handover instruction signal to the mobile station based on a scheduling start instruction from the first radio base station; and a step C of causing the second radio base station to repeat transmission of the handover instruction signal to the mobile station at a predetermined cycle for a period until detection of a scheduling stop trigger.

A second feature of the present invention is summarized as a radio base station operable as a second radio base station when a mobile station connected to a first cell under a first radio base station is subjected to a handover to a second cell under the second radio base station, including: a transmission unit configured to start transmission of a handover instruction signal to the mobile station based on a scheduling start instruction from the first radio base station. Here, the transmission unit is configured to repeat transmission of the handover instruction signal to the mobile station at a predetermined cycle for a period until detection of a scheduling stop trigger.

MODE FOR CARRYING OUT THE INVENTION (Mobile Communication System According to First Embodiment of Present Invention)

A mobile communication system according to first embodiment of the present invention will be described with reference to FIG. 1 to FIG. 3.

Figure 1:
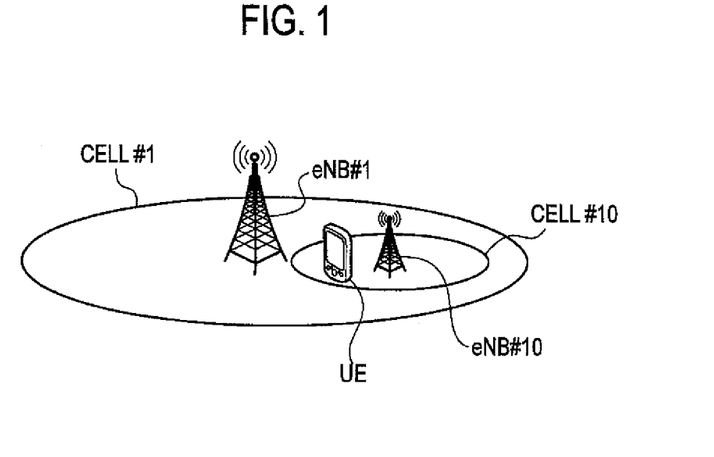
FIG. 1 is a view showing an overall configuration of a mobile communication system according to a first embodiment of the present invention.

As shown in FIG. 1, a mobile communication system of this embodiment includes a radio base station eNB #1 which manages a cell #1, and a radio base station eNB #10 which manages a cell #10.

An area covered by the cell #1 and an area covered by the cell #10 are designed to at least partially overlap each other geographically. Here, the cell #1 and the cell #10 are cells using the same frequency.

For example, the cell #1 may be a macro cell while the cell #10 may be a small cell such as a phantom cell.

Meanwhile, the mobile communication system of this embodiment is configured to be capable of carrying out CoMP on a downlink between the cell #1 under the radio base station eNB #1 and the cell #10 under the radio base station eNB #10 as well.

Note that this embodiment will be described on the assumption that a mobile station UE connected to the cell #1 is subjected to a handover to the cell #10. Moreover, this embodiment is designed such that "RRC diversity" is carried out when the handover takes place, i.e., that both the radio base station eNB #1 and the radio base station eNB #10 transmit "HO command" to the mobile station UE.

Figure 2:
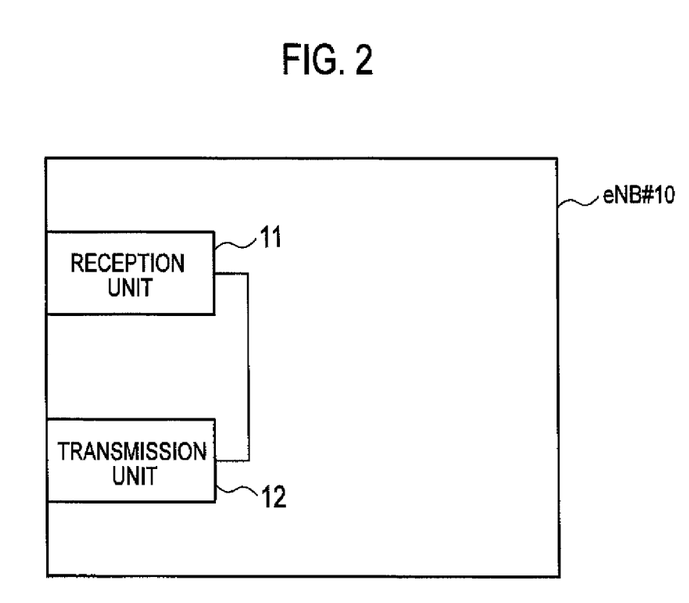
FIG. 2 is a functional block diagram of a radio base station eNB #10 according to the first embodiment of the present invention.

As shown in FIG. 2, the radio base station eNB #10 of this embodiment includes a reception unit 11 and a transmission unit 12.

The reception unit 11 is configured to receive various signals from a mobile station UE and the radio base station eNB #1. The transmission unit 12 is configured to transmit various signals to the mobile station UE and the radio base station eNB #1.

Specifically, in the case where the above-mentioned handover is carried out, the transmission unit 12 is configured to start transmission of the "HO command" to the mobile station UE based on a scheduling start instruction when the reception unit 11 receives the scheduling start instruction from the radio base station eNB #1.

The transmission unit 12 is configured to repeat transmission of the "HO command" to the mobile station UE at a predetermined cycle for a period thereafter until the detection of a scheduling stop trigger.

For example, at the point when the reception unit 11 receives the scheduling start instruction from the radio base station eNB #1, the mobile station UE might not be close to the cell #10 yet. Accordingly, the transmission unit 12 may be configured to start transmission of the "HO command" to the mobile station UE after a lapse of a predetermined period since the reception of the scheduling start instruction from the radio base station eNB #1.

Meanwhile, since uplink synchronization is not established between a handover destination radio base station eNB and the mobile station UE, no MAC-ACK is fed back to the "HO command" transmitted by the handover destination radio base station eNB. Accordingly, the transmission unit 12 may be configured to repeat transmission of the "HO command" without checking any MAC-ACK in response to the "HO command".

Note that MAC-ACK is fed back to the "HO command" transmitted from a handover source radio base station eNB.

Here, the above-mentioned predetermined cycle may be defined to be shorter than 8 ms, which represents a normal downlink HARQ retransmission interval.

Meanwhile, the transmission unit 12 may be configured to determine the detection of the above-mentioned scheduling stop trigger when the transmission unit 12 detects reception of a random access preamble from the mobile station UE.

Or, the transmission unit 12 may be configured to determine the detection of the above-mentioned scheduling stop trigger when the transmission unit 12 succeeds in CRC check of a signal from the mobile station UE transmitted through PUSCH (Physical Uplink Shared Channel) designated by a random access response.

Or, the transmission unit 12 may be configured to determine the detection of the above-mentioned scheduling stop trigger when the transmission unit 12 receives "RRC connection Reconfiguration complete" from the mobile station UE.

Or, the transmission unit 12 may be configured to determine the detection of the above-mentioned scheduling stop trigger when the transmission unit 12 receives a scheduling stop request from a different radio base station eNB (inclusive of the radio base station eNB #1).

Furthermore, the transmission unit 12 may be configured to determine the detection of the above-mentioned scheduling stop trigger when the transmission unit 12 does not receive a response signal from the mobile station UE after a lapse of a predetermined period since the start of transmission of the "HO command" to the mobile station UE.

An operation of the mobile communication system of this embodiment will be described below with reference to FIG. 3. Specifically, a description will be given of an operation of the radio base station eNB #10 when the mobile station UE is subjected to a handover from the cell #1 to the cell #10 in the mobile communication system of this embodiment.

Figure 3:
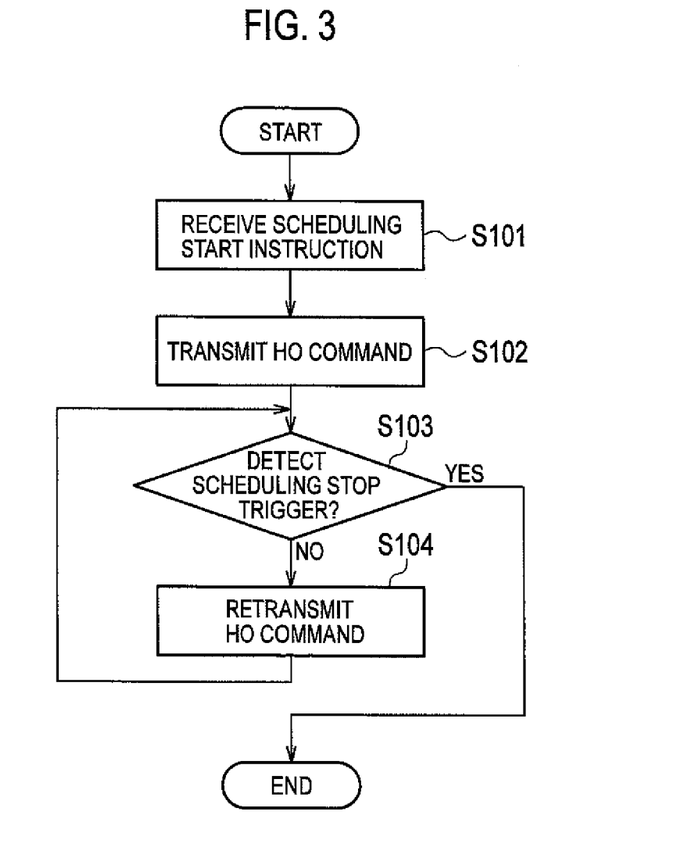
FIG. 3 is a flowchart showing an operation of the radio base station eNB #10 according to the first embodiment of the present invention.

As shown in FIG. 3, when the radio base station eNB #10 receives the scheduling start instruction from the radio base station eNB #1 in step S101, the radio base station eNB #10 transmits the "HO command" to the mobile station UE in step S102.

When the radio base station eNB #10 does not detect the scheduling stop trigger in step S103, the radio base station eNB #10 retransmits the "HO command" to the mobile station UE at a predetermined cycle in step S104.

The features of the present embodiment may also be expressed as follows.

A first feature of the present embodiment is summarized as a handover method of performing a handover of a mobile station UE connected to a cell #1 (first cell) under a radio base station eNB#1 (first radio base station) to a cell #10 (second cell) under a radio base station eNB#10 (second radio base station), including: a step A of causing the radio base station eNB#1 to transmit "HO command (handover instruction signal)" to the mobile station UE; a step B of causing the radio base station eNB#10 to start transmission of the "HO command" to the mobile station UE based on a scheduling start instruction from the radio base station eNB#1; and a step C of causing the radio base station eNB#10 to repeat transmission of the "HO command" to the mobile station UE at a predetermined cycle for a period until detection of a scheduling stop trigger.

According to the above-described aspect, when the "RRC diversity" is implemented in the handover procedure between the cells under the different radio base stations eNB, the radio base station eNB #10 can transmit the "HO command" to the mobile station UE at an appropriate timing based on the scheduling start instruction from the radio base station eNB #1.

In the first feature of the present embodiment, in the step B, the radio base station eNB#10 may start transmission of the "HO command" to the mobile station UE after a lapse of a predetermined period since reception of the scheduling start instruction from the radio base station eNB#1.

According to the above-described feature, it is possible to avoid a situation in which the radio base station eNB #10 transmits the "HO command" to the mobile station UE before the mobile station UE comes close to the cell #10.

In the first feature of the present embodiment, in the step C, the radio base station eNB#10 may repeat transmission of the "HO command" without checking MAC-ACK (delivery acknowledgment signal) in response to the "HO command".

According to the above-described feature, the radio base station eNB #10 can repeatedly transmit the "HO command" to the mobile station UE even in a situation where uplink synchronization is not established between the radio base station eNB #10 and the mobile station UE and no MAC-ACK is therefore fed back to the "HO command" transmitted by the radio base station eNB #10.

In the first feature of the present embodiment, the predetermined cycle may be shorter than 8 ms.

According to the above-described feature, the radio base station eNB #10 can repeatedly transmit the "HO command" to the mobile station UE in a period shorter than 8 ms, which represents the normal downlink HARQ retransmission interval, in the situation where no MAC-ACK is fed back to the "HO command" transmitted by the radio base station eNB #10.

In the first feature of the present embodiment, in the step C, the radio base station eNB#10 may determine the detection of the scheduling stop trigger when the radio base station eNB#10 detects reception of a random access preamble from the mobile station UE.

According to the above-described feature, the radio base station eNB #10 can stop transmission of the "HO command" since the radio base station eNB #10 can determine the reception of the "HO command" by the mobile station UE by detecting the reception of the random access preamble from the mobile station UE.

In the first feature of the present embodiment, in the step C, the radio base station eNB#10 may determine the detection of the scheduling stop trigger when the radio base station eNB#10 succeeds in CRC check of a signal transmitted from the mobile station UE through PUSCH (physical uplink shared channel) designated by a random access response.

According to the above-described feature, the radio base station eNB #10 can stop transmission of the "HO command" since the radio base station eNB #10 can determine the reception of the "HO command" by the mobile station UE by detecting the success in the above-mentioned CRC check.

In the first feature of the present embodiment, in the step C, the radio base station eNB#10 may determine the detection of the scheduling stop trigger when the radio base station eNB#10 receives "RRC connection Reconfiguration complete (RRC connection reconfiguration complete signal)" from the mobile station UE.

According to the above-described feature, the radio base station eNB #10 can stop transmission of the "HO command" since the radio base station eNB #10 can determine the reception of the "HO command" by the mobile station UE by detecting the reception of the "RRC connection Reconfiguration complete" from the mobile station UE.

In the first feature of the present embodiment, in the step C, the radio base station eNB#10 may determine the detection of the scheduling stop trigger when the radio base station eNB#10 receives a scheduling stop request from a different radio base station eNB.

According to the above-described feature, the radio base station eNB #10 can stop transmission of the "HO command" since the radio base station eNB #10 can determine the reception of the "HO command" by the mobile station UE by detecting the reception of the scheduling stop request from the different radio base station eNB.

In the first feature of the present embodiment, in the step C, the radio base station eNB#10 may determine the detection of the scheduling stop trigger when the radio base station eNB#10 does not receive a response signal from the mobile station UE even after a lapse of a predetermined period since the start of transmission of the "HO command" to the mobile station UE.

According to the above-described feature, when the radio base station eNB #10 does not receive the response signal from the mobile station UE after the lapse of the predetermined period since the start of transmission of the "HO command" to the mobile station UE, the radio base station eNB #10 can determine that a trouble of some sort occurs either in the mobile station UE or in a radio section and hence stop transmission of the "HO command".

A second feature of the present embodiment is summarized as a radio base station eNB operable as a radio base station eNB#10 (second radio base station) when a mobile station UE connected to a cell #1 (first cell) under a radio base station eNB#1 (first radio base station) is subjected to a handover to a cell #10 (second cell) under the radio base station eNB#10, including: a transmission unit 12 configured to start transmission of "HO command" to the mobile station UE based on a scheduling start instruction from the radio base station eNB#1. Here, the transmission unit 12 is configured to repeat transmission of the "HO command" to the mobile station UE at a predetermined cycle for a period until detection of a scheduling stop trigger.

According to the above-described aspect, when the "RRC diversity" is implemented in the handover procedure between the cells under the different radio base stations eNB, the radio base station eNB #10 can transmit the "HO command" to the mobile station UE at an appropriate timing based on the scheduling start instruction from the radio base station eNB #1.

It should be noted that the foregoing operations of the mobile station UE and the radio base stations eNB#1 and eNB#10 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base stations eNB#1 and eNB#10. Otherwise, the storage medium and the processor may be provided as discrete components inside the mobile station UE and the radio base stations eNB#1 and eNB#10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-099417 (filed on May 9, 2013) is incorporated by reference in the present specification.

INDUSTRIAL APPLICABILITY

As described above, according to the present invention, it is possible to provide a handover method and a radio base station which are capable of transmitting "HO command" in a handover destination cell at an appropriate timing in implementation of "RRC diversity" in a handover procedure between cells under different radio base stations eNB.

EXPLANATION OF THE REFERENCE NUMERALS eNB #1/eNB #10 radio base station
UE mobile station
11 reception unit
12 transmission unit

The invention claimed is:

1. A handover method of performing a handover of a mobile station connected to a first cell under a first radio base station, to a second cell under a second radio base station, comprising:
   a step A of causing the first radio base station to transmit a handover instruction signal to the mobile station;
   a step B of causing the second radio base station to start transmission of the handover instruction signal to the mobile station based on a scheduling start instruction from the first radio base station; and
   a step C of causing the second radio base station to repeat transmission of the handover instruction signal to the mobile station at a predetermined cycle for a period until detection of a scheduling stop trigger,
   wherein the mobile station is in communication with the first and second cells using Coordinated Multi-Point (CoMP) transmission, and
   a period of transmission of the handover instruction signal by the first radio base station at least partly overlaps with a period of the transmission of the handover instruction signal by the second radio base station.

2. The handover method according to claim 1, wherein, in the step B, the second radio base station starts transmission of the handover instruction signal to the mobile station after a lapse of a predetermined period since reception of the scheduling start instruction from the first radio base station.

3. The handover method according to claim 1, wherein, in the step C, the second radio base station repeats transmission of the handover instruction signal without checking a delivery acknowledgment signal in response to the handover instruction signal.

4. The handover method according to claim 1, wherein the predetermined cycle is shorter than 8 ms.

5. The handover method according to claim 1, wherein, in the step C, the second radio base station determines the detection of the scheduling stop trigger when the second radio base station detects reception of a random access preamble from the mobile station.

6. The handover method according to claim 1, wherein, in the step C, the second radio base station determines the detection of the scheduling stop trigger when the second radio base station succeeds in CRC check of a signal transmitted from the mobile station through a physical uplink shared channel designated by a random access response.

7. The handover method according to claim 1, wherein, in the step C, the second radio base station determines the detection of the scheduling stop trigger when the second radio base station receives an RRC connection reconfiguration complete signal from the mobile station.

8. The handover method according to claim 1, wherein, in the step C, the second radio base station determines the detection of the scheduling stop trigger when the second radio base station receives a scheduling stop request from a different radio base station.

9. The handover method according to claim 1, wherein, in the step C, the second radio base station determines the detection of the scheduling stop trigger when the second radio base station does not receive a response signal from the mobile station even after a lapse of a predetermined period since the start of transmission of the handover instruction signal to the mobile station.

10. A radio base station operable as a second radio base station when a mobile station connected to a first cell under a first radio base station is subjected to a handover to a second cell under the second radio base station, comprising:
    a transmitter that starts transmission of a handover instruction signal to the mobile station based on a scheduling start instruction from the first radio base station, wherein
    the transmitter repeats transmission of the handover instruction signal to the mobile station at a predetermined cycle for a period until detection of a scheduling stop trigger,
    wherein the mobile station is in communication with the first and second cells using Coordinated Multi-Point (CoMP) transmission, and
    a period of transmission of the handover instruction signal by the first radio base station at least partly overlaps with a period of the transmission of the handover instruction signal by the second radio base station.

* * * * *